Jan. 13, 1953     L. GESS     2,625,167
LINKAGE MANUALLY OPERABLE TO SHIFT THE SET
POINT OF ONE OR TWO CONTROL INSTRUMENTS
Filed Jan. 2, 1947     2 SHEETS—SHEET 1

*INVENTOR.*
LOUIS GESS
BY *E. Wellford Mason*
ATTORNEY

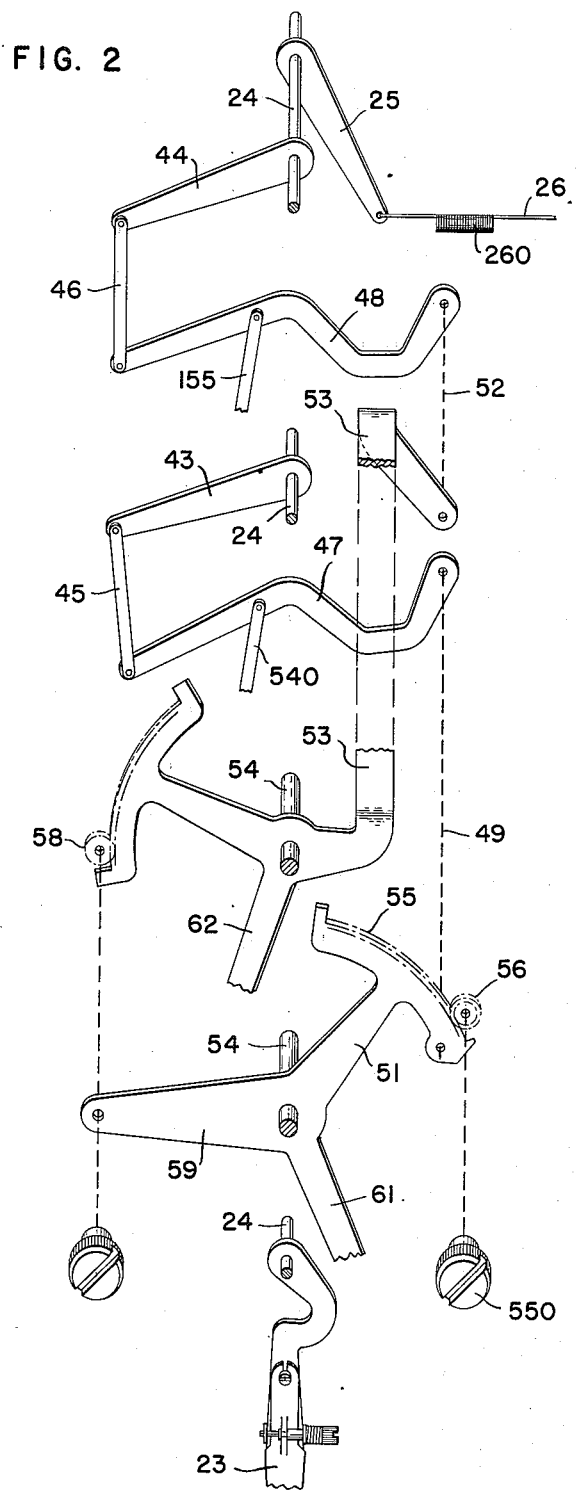

Patented Jan. 13, 1953

2,625,167

UNITED STATES PATENT OFFICE 2,625,167

LINKAGE MANUALLY OPERABLE TO SHIFT THE SET POINT OF ONE OR TWO CONTROL INSTRUMENTS

Louis Gess, Jenkintown, Pa., assignor, by mesne assignments, to Minneapolis-Honeywell Regulator Company, Minneapolis, Minn., a corporation of Delaware Application January 2, 1947, Serial No. 719,753

9 Claims. (Cl. 137—82)

The present invention relates to control instruments, and more particularly to the mechanism for adjusting the control point of such instruments. In a broad sense, the instrument may be used to control the variation of a condition between two points an adjustable distance apart, which points may be at any place in the range of the instrument.

While the instrument may be used in connection with any type of variable condition, it is described herein by way of example as controlling a timer so that the time required for the liquid level to change a given amount at any point in a tank may be determined. The instrument is shown as including two pneumatic control units. One of these units is operated when the liquid level in a tank reaches a predetermined point and the other is operated when the liquid level reaches a second predetermined point. The distance between these points may be varied and the portion of the tank in which they occur may also be varied.

It is an object of the invention to provide a control instrument which is operative to actuate a control at a plurality of points in the range of the instrument. It is a further object of the invention to provide a control instrument having a control point adjusting mechanism which can be operated to adjust in sequence a plurality of control units at any point within the range of the instrument and at any point with respect to each other.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Fig. 2 is an exploded view of the linkage portion of the control instrument.

Figure 1:
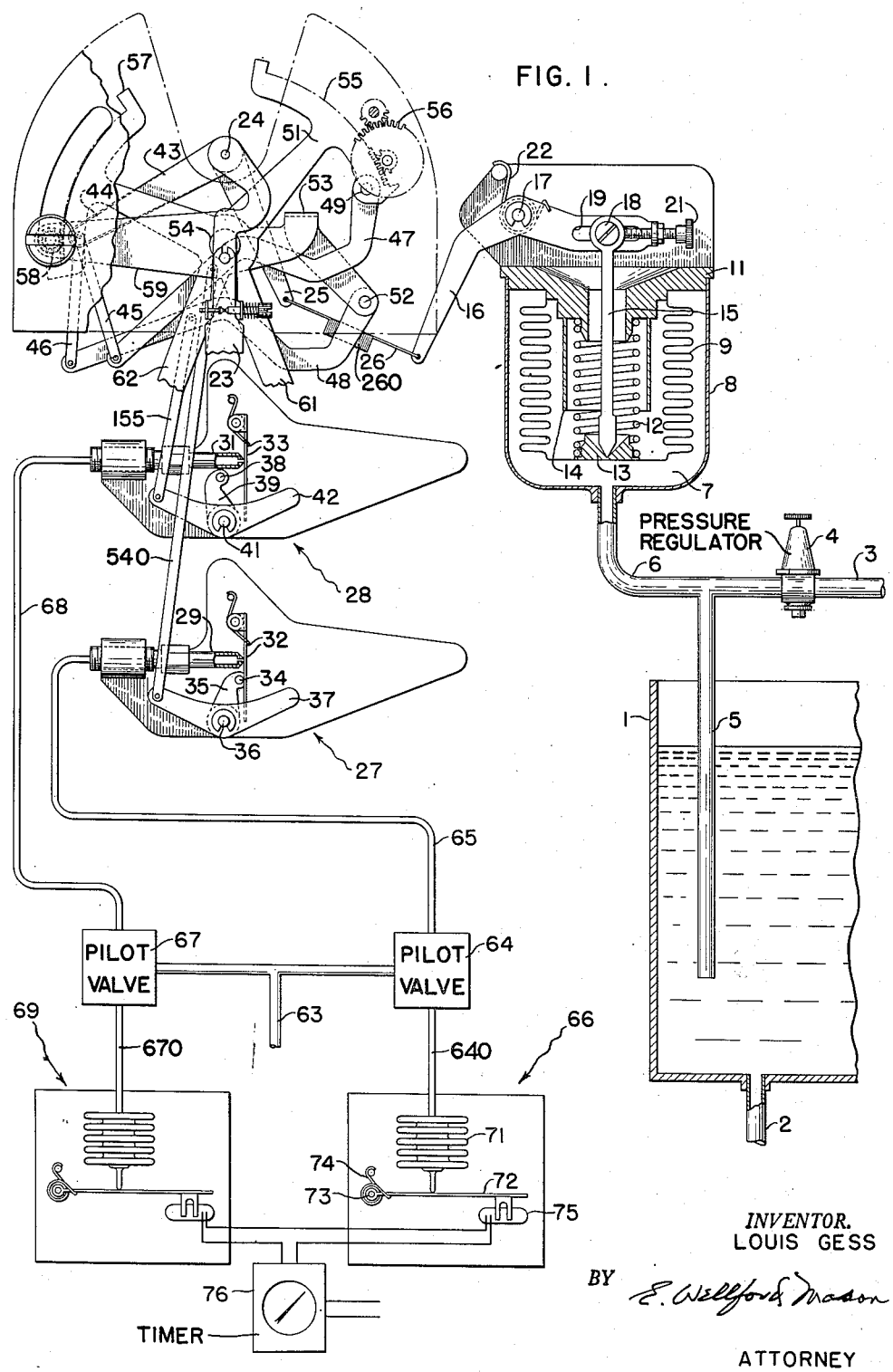
Fig. 1 shows diagrammatically the control instrument of the present invention and a control system in which it may be used.

Referring to the drawing there is shown a tank 1 having an outlet 2 through which the liquid in the tank is to flow. In order to measure the level of the liquid in this tank a so-called back pressure system is used. With a system of this type a small stream of air is continually blown through a pipe that is immersed in the liquid and the back pressure of this air is measured in terms of liquid level. To this end air under pressure is supplied through a pipe 3 past a pressure regulator 4 and through a pipe 5 which is immersed in the liquid. A continuation 6 of the pipe extends to an expansible chamber 7 which is formed between a rigid casing 8 and a bellows element 9 that are attached to a stationary frame 11. In the operation of the system, regulator 4 is adjusted so that a small stream of air continually bubbles from the lower end of pipe 5 up through the liquid. The pressure of this air will, of course, vary to elongate or contract bellows 9 in accordance with this level.

The chamber 7 forms a part of a pressure responsive unit including the bellows and casing. The bellows is normally held in an extended position by a spring 12, one end of which engages a seat formed on the support 11 and the other end of which engages a seat 13 that is suitably attached to the end wall of the bellows. It is noted that a stop 14 is provided to limit the extent to which the bellows can collapse. As the bellows elongates and collapses, its movements are transferred through a bellows rod 15 to one arm of a bell-crank lever 16 that is pivoted on support 11 at 17. The rod is adjustably connected to the bell-crank by means of a pivot 18 that is received in a slot 19 formed in the bell-crank. Screw 21 is used to adjust the position of pivot 18 in the slot so that the amount of movement imparted to the bell-crank for a given change in the length of the bellows may be accurately adjusted. A spring 22 is provided which continually biases the bell-crank in a clockwise direction so that bellows rod 15 will always be in engagement with the socket formed in spring seat 13.

Movement of bell-crank 16 is transferred to an indicating pointer 23 which moves across a scale, not shown, that is calibrated in terms of liquid level. This pointer is mounted on a rotatable shaft 24 which is pivoted in some suitable portion of the instrument mechanism. Also attached to the shaft 24 is an arm 25 the lower end of which is connected by a link 26 with the lower arm of bell-crank 16. Link 26 has its midportion 269 in the form of a coil spring. Thus, as the bellows changes in length an indicating pointer will be moved to indicate on a suitable scale the level of the liquid in tank 1.

As the indicating pointer is moved it serves to actuate a pair of control units 27 and 28 which may be of any desired type, but are shown herein as air control units. Each of these control units comprises a nozzle 29 or 31 and a flapper 32 or 33 respectively. The flappers are suitably pivoted and are normally biased in a direction to close the nozzle port. Flapper 32 of the lower unit is moved away from the nozzle 29 by means of a pin 34 which projects downwardly from an arm 35 pivoted to the unit base plate at 36. Also fastened to the pivot 36 is a lever 37 by means of which the arm and pin may be rotated. In a like manner the flapper 33 of the upper unit is moved away from the nozzle 31 of that unit by means of a pin 38 which projects downwardly from an arm 39 that is pivoted on the unit base at 41. There is also provided a lever 42 which is attached to arm 39 so that this arm may be moved. Movement is imparted to the two flapper actuating levers 37 and 42 from the indicator shaft 24 through an operating mechanism now to be described. Shaft 24 has attached to it and projecting from it to the left a pair of arms 43 and 44 which have attached to them respectively, the upper ends of links 45 and 46. The lower ends of these links are attached to the left ends of a pair of floating levers 47 and 48, the former of which has its right end pivoted at a normally stationary point 49 and the latter of which has its right end pivoted at a normally stationary point 52. Point 49 is mounted on an arm 51 while point 52 is mounted on an arm 53. Movement of floatnig lever 47 around its pivot due to change in the liquid level is imparted to flapper actuating lever 37 by means of a link 540 and movement of shaft 24 is imparted to flapper actuating lever 42 by means of a link 155 extending from floating lever 48.

The control point of control unit 27 or the point at which the flapper 32 will engage or be moved away from nozzle 29 is adjusted by rotating lever 51 around a pivot 54. This is accomplished by forming the right end of lever 51 with a segment that has gear teeth 55 formed on its outer surface. Arm 51 is rotated by means of these gear teeth from a gear train 56. A suitable knob 550 is provided to rotate the last pinion of the train so that the arm 51 may be manually positioned at any desired place in the range of the instrument. Adjustment of the control point of control unit 28 is accomplished by moving arm 53 around pivot 54. To this end arm 53 extends to the left of pivot 54 and is provided on its left end with a segment 57 that is formed on its outer end with gear teeth that mesh with a pinion 58 which is pivoted upon the outer end of an arm 59 that forms an extension of arm 51. In the arrangement shown, rotation of arm 51 normally acts through pinion 58 and the gear teeth on segment 57 to rotate simultaneously the two parts 51 and 53. These parts may be adjusted relative to each other, however, by rotating pinion 58. It is noted that a control index 61 extends from arm 51 to indicate on the scale of the instrument the control point setting of the control unit 27. Likewise, a pointer 62 extends from arm 53 to cooperate with the scale and indicate the control point setting of control unit 28. It will be seen that normally rotation of gear train 56 will adjust simultaneously the control points of the two units but that the control point of unit 28 may be separately adjusted by rotation of pinion 58 to change the angular relation of parts 51 and 53.

As an example of the use of the instrument of this invention the control units are shown herein as being used to start and stop a timer to determine how long it takes the liquid level in tank 1 to drop through a given distance. To this end a filtered and regulated air supply is supplied through a pipe 63 to a pilot valve 64 which may well take the commercial form shown in Moore Patent 2,303,891. This pilot valve is provided with a small pipe 65 extending between it and nozzle 29 and also with an outlet pipe 640 extending to a pressure responsive switch 66. In a like manner air is also supplied from pipe 63 to a similar pilot valve 67 that is provided with a small pipe 68 extending to nozzle 31 and with an output pipe 670 extending to a second pressure control switch 69. Each control switch includes a bellows 71 the expansion and contraction of which serves to move a lever 72 around a pivot 73. Normally this lever is biased in a counterclockwise direction by a spring 74. As the lever 72 of the switch 66 is moved in a clockwise direction it serves to move a mercury switch 75 carried thereby in a direction to cause the switch to open. The switch mechanism 69 is exactly the same as switch mechanism 68 except that the position of the mercury switch in its holder has been reversed so that expansion of the bellows in that unit, with the consequent clockwise movement of the switch supporting lever, will serve to close the switch.

In the operation of the control systems movement of either flapper toward its nozzle will block the escape of air through that nozzle and act on the pilot valve to increase the pressure of the air in the outlet line of the pilot valve. This in turn will cause the bellows of the switch unit to be expanded. In the arrangement shown, the movement of flapper 32 toward nozzle 29 will cause the bellows of the switch unit 66 to be expanded to open switch 75 whereas movement of flapper 33 toward nozzle 31 will operate through pilot valve 67 to close its switch. As shown in the drawing these switches are connected in series in the control circuit of a timer 76. Therefore when both of the switches are closed the timer is operating but when either of the switches is opened the timer stops.

In the operation of the system the control points of the two control units 27 and 28 are so adjusted that some predetermined drop in liquid level will occur between the operation of one unit and the operation of the other. Thereafter they will be adjusted together so that the control point of the unit 27 is slightly below the level of the liquid then in the tank. As liquid flows from the tank through outlet 2, the level of the liquid will decrease and cause shaft 24 to be rotated in a clockwise direction. This rotation will gradually raise the left end of the two floating levers 47 and 48. Just as the level of the liquid reaches the point for which the control point of unit 27 is set flapper 32 will be moved away from nozzle 29 thus reducing the pressure in the nozzle line. This acts through pilot valve 64 to reduce the pressure in the bellows of switch unit 66 and cause this bellows to contract so that switch 75 will be closed. Timer 76 is therefore started in operation. As the liquid level in tank 1 continues to drop the left ends of levers 47 and 48 will be continued to be raised. Movement of lever 47 has no further effect upon the control unit 27. Continued movement of lever 48, however, will eventually bring pin 38 into engagement with flapper 33 to move this flapper away from nozzle 31. Pilot valve 67 will therefore operate to reduce the pressure in the bellows of switch unit 69 causing the switch of that unit to open and stop timer 76. The timer will therefore indicate the amount of time required for the liquid level in tank 1 to drop an amount determined by the control point setting of the two control units 27 and 28. Such an operation is useful, for example, in determining the viscosity of a liquid in which the time required for a given amount of liquid to flow through an orifice of known size is a necessary part of the computations. Another example of the use of such a system is to determine the amount of time required for an engine to burn a given amount of fuel.

By rotation of pinion 58 the control points of the two units 27 and 28 may be adjusted relative to each other so that the timer will be operated when any desired amount of the liquid has been removed from tank 1. After this differential setting has been made gear train 56 may be rotated to successively adjust the control point of the two units so that repeated readings of the timer may be taken without the necessity of individually adjusting the two control units. For example, if one engine has been tested to see how much time is required to burn a given amount of fuel, outlet pipe 2 may be connected to a second engine and gear train 56 adjusted so that the control point of unit 27 is equal with the new level of the liquid and the second engine started. By using an instrument with the control point adjusting mechanism arranged as shown, herein, the operation may be quickly repeated with a minimum of adjustment between each operation.

While in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure with Letters Patent is:

1. In a control instrument having an element movable in response to variations in the value of a condition, the combination of a first control unit having an actuating member, a second control unit having an actuating member, a lever mechanism including a floating lever having a normally stationary end extending between said element and said first actuating member, a second lever system including a second floating lever having one end normally stationary extending between said element and said second actuating member, means having connections to move simultaneously the normally stationary ends of said two floating levers, and means having connections to move the normally stationary ends of said two floating levers relative to each other.

2. In a control instrument having two control units actuated by one condition-responsive element, control point adjusting mechanism including, a first floating lever movable at one point in response to said element and pivotally mounted at another point, a second floating lever movable at one point in response to said element and pivotally supported at a second point, a pair of links each extending between one of said floating levers and one of the control units, a first manually-operable handle controlling connections for moving the points about which both said first and said second floating levers are pivoted so as to adjust the set points of the control units connected to said first and second floating levers and to maintain constant the differential between the set points of the control units, and a second manually operable handle controlling connections for moving the point about which said second floating lever is pivoted so as to adjust the control point of the control unit connected to said second floating lever relative to the control point of the other control unit.

3. A manually operable linkage for adjusting the set points of two control units which are responsive to a single measuring element, including, a first floating lever pivoted at one point about a relatively stationary pivot and movable at another point in response to the movements of the measuring element and having connection from a third point to one of the control units, a second floating lever pivoted at one point about a relatively stationary pivot and movable at another point in response to movements of the measuring element and having connection from a third point to the other control unit, a third lever mounted on a stationary pivot and bearing at one point the pivot for said first floating lever, a manually-operable handle for rotating said third lever about its stationary pivot to thereby adjust the set points of the control units connected to said floating levers, and a second manually-operable handle pivotally mounted on said third lever and having connections for adjusting the pivot of said second floating lever to thereby adjust the set point of the control unit connected to said second floating lever.

4. In a control instrument having a plurality of control units, a plurality of floating levers each pivoted at one point to an individual support, connections to move another point of each of said levers in response to variations in a condition, a first manually operable knob having connections for moving the pivots of at least two of said floating levers, a second manually operable knob having connections for moving the pivot of a second of said two floating levers relative to the pivot for a first of said two floating levers, and a plurality of links each connecting one of said floating levers to one of the control units.

5. A manually-operable linkage for adjusting the set points of two control units which are actuated by one condition-responsive element, including, a pair of floating levers each actuated at one point by said element and each pivotally mounted at another point, a pair of supporting levers pivotally mounted on a stationary pivot and each supporting the pivot for one of said floating levers, a first manually-operable knob for rotating both of said supporting levers about their stationary pivot, a second manually-operable knob for rotating one of said levers about its pivot while the other of said supporting levers remains stationary, and a pair of links each pivoted to one of said floating levers and to one of the control units.

6. In a controller, a pair of floating levers each pivoted at one point to an individual support, connections to move another point of each of said levers in response to variations in a condition, a first manually-operable knob having connections for moving the pivots of both of said floating levers, and a second manually-operable knob having connections for moving the pivot of one of said floating levers relative to the pivot of the other of said floating levers while said other floating lever remains stationary.

7. A manually-operable linkage for adjusting the set point of each of a plurality of control units which are actuated by one condition-responsive element, including, a first differentially operable mechanism having one input thereto connected to said element and the output therefrom connected to one of said units, a second differentially operable mechanism having one input thereto connected to said element and the output therefrom connected to another of said units, a first readily-accessible manually-operable handle connected to the other input of each of said differentially operable mechanisms so as to locate the set point of each of the units connected thereto, and a second readily-accessible manually-operable handle connected to the other input of but one of said differentially operable mechanisms so as to locate the set point of only that unit connected thereto and without changing the set point of any of the other units.

8. In an industrial process controller having a condition-responsive element and a plurality of control units governed thereby, a first mechanical linkage connected so as to be actuated by said element and so as to actuate one of said units, a second mechanical linkage connected so as to be actuated by said element and so as to actuate another of said units, a stationary support, an externally exposed operating element having a part movably carried by said stationary support and connected to both of said linkages so as to actuate each of the units connected to said linkages, and a second externally exposed operating element having a portion movably mounted on said support and connected to but one of said linkages so as to actuate only that linkage and only the unit controlled by it.

9. Mechanism for regulating the set point of a plurality of control units governed by a single condition-responsive element, including, a first linkage connecting said element to one of said units, a second linkage connecting said element to another of said units, a stationary support, a lever pivotally mounted on said stationary support and connected to each of said units, a first externally exposed operating element for turning said lever about said support so as to actuate each of said units, and a second externally exposed operating element carried by said lever and interposed in the connections between said first operating element and one of said units so that said second operating element can adjust the connections between said first lever and one of said units so as to move said one unit without disturbing the other.

LOUIS GESS.

REFERENCES CITED

The following references are of record in the file of this patent:

UNITED STATES PATENTS

| Number | Name | Date |
|---|---|---|
| 1,222,865 | Haughton | Apr. 17, 1917 |
| 1,679,417 | Garnier | Aug. 7, 1928 |
| 2,080,212 | Otto | May 11, 1937 |
| 2,169,175 | Ziebolz | Aug. 8, 1939 |
| 2,202,218 | Mallory | May 28, 1940 |
| 2,272,256 | Vogt | Feb. 10, 1942 |
| 2,304,993 | Franck | Dec. 15, 1942 |
| 2,351,640 | Scott et al. | June 20, 1944 |
| 2,253,692 | Cunningham | July 18, 1944 |
| 2,386,108 | Gess | Oct. 2, 1945 |